United States Patent [19]

Streck

[11] Patent Number: 4,750,909

[45] Date of Patent: Jun. 14, 1988

[54] METALLIZED AZO DYE COMPOSITION AND METHOD OF DYEING THEREWITH

[76] Inventor: Clemens Streck, 12 Upper Loudon Rd., Albany, N.Y. 12211

[21] Appl. No.: 946,945

[22] Filed: Dec. 29, 1986

[51] Int. Cl.$^4$ ............................................. D06P 3/80
[52] U.S. Cl. ........................................ 8/523; 8/522; 8/609; 8/685; 8/581
[58] Field of Search ................................. 8/523, 527

[56] References Cited

U.S. PATENT DOCUMENTS

| | | | |
|---|---|---|---|
| 3,079,209 | 2/1963 | Boggus | 8/523 |
| 3,092,836 | 6/1963 | Boggus | 8/523 |
| 3,425,784 | 2/1969 | Streck | 8/523 |
| 3,441,362 | 4/1969 | Streck | 8/523 |
| 3,494,715 | 2/1970 | Streck | 8/523 |
| 3,545,909 | 12/1970 | Gaguardi | 8/523 |
| 4,430,091 | 2/1984 | Streck | 8/523 |

OTHER PUBLICATIONS

"Colour Index," Third Edition, (Soc. Dyers and Colourists) 1971, vol. 4, C.I. 12195; C.I. 15675.

Primary Examiner—A. Lionel Clingman
Attorney, Agent, or Firm—Samson B. Leavitt; Michael A. Leavitt

[57] ABSTRACT

A liquid dye composition comprising an organic solvent-soluble premetallized azo dyestuff in a volatile organic solvent medium, said composition further containing a finely divided silica thickening agent and/or xylol, toluol, perchlorethylene or mineral spirits or any mixture thereof. A process for coloring a porous substrate, preferably stone, comprising applying thereto a liquid dye composition comprising an organic solvent-soluble premetallized azo dyestuff in a volatile organic solvent medium, said composition being preferably as described above, and allowing the composition to penetrate the substrate, preferably followed by treating the penetrated substrate with an aqueous solution of a copper salt or a polymerizable organic siliconate, and then removing any excess unpenetrated composition from the substrate.

19 Claims, No Drawings

METALLIZED AZO DYE COMPOSITION AND METHOD OF DYEING THEREWITH

This invention relates to new and improved dye compositions and methods for coloring porous substrates, especially porous stone.

Many compositions and methods have been heretofore proposed and employed for coloring porous substrates, but only a relatively few have found application for coloring rigid porous substrates such as artificial and especially natural stone. For example, in U.S. Pat. No. 3,425,784 issued Feb. 4, 1969, I have disclosed such a method involving use of a solution of water-soluble leuco esters of vat dye-stuffs. In U.S. Pat. No. 3,494,715 issued Feb. 10, 1970, I have disclosed means for coloring porous stone involving applying thereto a solution of an oxidation base and a strong acid in an aqueous/water-miscible solvent medium, allowing the solution to penetrate the porous stone and treating the penetrated stone with an aqueous solution of an oxidizing agent, e.g., 10–35% aqueous hydrogen peroxide, to produce the desired color. Such means have however not been entirely satisfactory, especially for the production of black-colored products, yielding instead undesirable grey to reddish black colorations. Other deficiencies include insufficient storage or shelf stability, difficulties in application, unduly slow rate of oxidation of the dye-treated stone, weak and/or non-uniform final colorations, unduly high light-reflective properties, and/or variations of desired black shades from gray to reddish gray, especially after storage for some time. And in U.S. Pat. No. 4,430,091 issued Feb. 7, 1984, I have disclosed such means involving applying to the substrate an organic solvent medium containing an oxidation base, acetic acid and a higher alkyl benzene sulfonic acid and then treating the penetrated substrate with an aqueous solution of an oxidizing agent.

There is a need to be able to color rigid porous material, especially marble, granite and other porous stone in a multitude of hues, in a manner that is relatively uncomplicated, economically feasible, of sufficient fastness to water and cleaning materials normally employed, of high enough fastness to light, solvents, scrubbing and abrasion, of deep enough penetration of the dye into the substrate to withstand normal wear in traffic, to be commercially acceptable.

To accomplish this purpose proper dyestuff selection is important. Such dyes should have a reasonable degree of solubility in water, but more importantly good solubility in polar organic solvents or in a mixture of polar and non-polar organic solvents. It is known that oil soluble dyes and organic soluble dyes, like gasoline-soluble dyes and dyes for wax (candles) have been used. Deep shades are difficult to obtain with them and the fastness properties are usually poor.

Consumer commercial demand also, more specifically, exists for means to color relatively inexpensive white marble in shades of the more expensive natural colored marble, to color marble, tile and similar stone floors and the grout therein simultaneously, and to provide rigid porous material, including artificial and natural stone with color schemes and patterns not available in natural stone.

It is an object of this invention to provide means for coloring porous substrates, especially rigid porous substrates, more especially artificial and natural stone, which will not be subject to one or more of the above deficiencies and disadvantages and/or will satisfy one or more of the above needs and demands. Other objects and advantages will appear as the description proceeds.

The attainment of the above object is made possible by this invention which in accordance with certain of its aspects includes a process for coloring a porous substrate comprising (1) applying thereto a liquid dye composition comprising at least one organic solvent-soluble pre-metallized azo dyestuff in a substantially anhydrous volatile organic solvent medium, (2) allowing the composition to penetrate the substrate, and (3) removing excess unpenetrated composition from the substrate, preferably followed by (4) treating the penetrated substrate with an aqueous solution of (a) a copper salt, or (b) a polymerizable organic siliconate. Preferably said composition contains about 1.5 to about 25 wt. % of at least one chromium complexed, nuclearly sulfonamide-substituted such dyestuff, said solvent medium contains either or both the ethyl and propyl ethers of ethylene glycol, and said substrate is natural or aritificial stone.

This invention also includes in accordance with certain other of its aspects a novel liquid dye composition comprising at least one organic solvent-soluble pre-metallized azo dyestuff in a substantially anhydrous volatile organic solvent medium, said composition further containing at least one member of the group consisting of, approximately by weight:

A. 1.5 to 12% of finely divided silica thickening agent, and

B. 5 to 50% of xylol, toluol, perchlorethylene, or mineral spirits or any mixture thereof. Preferably, said dyestuff is metallized with chromium, cobalt or nickel and contains a solfonamide group as nuclear substituent, and said solvent medium comprises the ethyl ether of ethylene glycol, the propyl ether of ethylene glycol, or both.

This invention also includes in still another of its aspects a process for coloring a porous substrate comprising (1) applying thereto said novel dye composition, (2) allowing the composition to penetrate the substrate, and (3) removing excess unpenetrated composition from the substrate, preferably followed by (4) treating the penetrated substrate with an aqueous solution of (a) a copper salt, or (b) a polymerizable organic siliconate.

The above-described aspects of this invention have been unexpectedly found to enable attainment of the said objects and desired results. More particularly, in the initial stages of the development of this invention, premetallized azo dye-stuffs, especially certain types devoid of water-solubilizing groups such as carboxyl and sulfonic groups, and containing at least one sulfonamide group as a nuclear substituent, were selected as being superior to other types of dyestuffs and pigments for the desired purpose, being very soluble in polar and mixed polar/non-polar solvents, with a high degree of fastness to light. Solutions of these dyestuff were applied to marble, granite and similar stone surfaces with a cloth, pad, roller application or the like. In most instances, the operation had to be repeated to obtain a uniform coloration. After allowing the solution to penetrate the substrate for 10, 20 40 and 60 minutes, excess dye liquid was removed with a paper towel or cloth and the surface wiped clean with a damp cloth or paper towel. In most instances, the colorations at 40 or 60 minutes were not much different from those at 20 minutes. In some cases, the appearance, especially on honed (satin finish) surfaces, was frosty. The character of the colorations was more pleasing and penetration somewhat better when organic solvent solutions of dyestuff were employed. Substantially all however were deficient in fastness to water.

Premetallized azo dyestuffs operative herein are well known and readily available. As representative of such dye-stuffs, reference is made to Vialon Fast dyes of BASF-Ludwigshafen, Germany and BASF-Wyandotte-Rennselaer, N.Y. They are available in liquid form as solutions of about 10 wt. % in Propyl Cellosolve (propyl ether of ethylene glycol), Cellosolve (ethyl ether of ethylene glycol), or mixtures thereof, and in more concentrated "Conc." form as about 20 wt. % solutions. The dyestuffs are generally monoazo but may contain 2 or more azo groups, are devoid of carboxylic and sulfonic groups and contain at least one nuclearly substituted sulfonamide group which aids in providing the desired property of solubility in polar and mixed polar/non-polar solvents. This metal complex is generally cobalt, nickel and especially chromium, usually in azo group/metal molar ratios of 1/1 to 2/1, each azo group being associated with ortho, ortho'nuclearly substituted metallizable, preferably OH, groups. Illustratively, VF (Vialon Fast) dye Rubine BL Liq., Acid Red 296, C.I. 15675, contains the complex of 1 atom of chromium with 2 mol. of the monoazo dye 2-amino-1-phenol-4-sulfonamide→2 naphthol of the formula

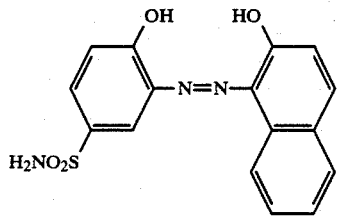

The dye solutions generally contain about 1.5 to about 25 wt. % of the dye in a volatile organic solvent medium containing a polar (more or less water-miscible) solvent such as one or both of the propyl and ethyl ethers of ethylene glycol, admixed if desired with minor proportions of Cellosolve Acetate, diacetone alcohol, dimethyl formamide (DMF), dimethyl sulfoxide (DMSO) and/or Butyl Cellosolve. Volatility is essential to expedite evaporation of the solvent medium form, and fixation of the penetrated dyestuff in, the porous substrate.

Although the aforementioned solvent medium usually provides adequate solvency properties and penetration into the porous substrate, it has been found that inclusion in the liquid dye composition of ca. 5-50%, preferably 10-25% of one or a mixture of non-polar (water immiscible) organic voltatile solvents such as perchlorethylene and preferably toluol and xylol, and/or about 5 to about 20 wt. % of mineral spirits often provides improved solvency and/or penetration. It will be understood that the term "solution" as applied to the liquid dye compositions of this invention is inclusive of colloidal solutions and emulsions since, for example, certain solvents and other liquid components therein may be mutually immiscible.

In the development of this invention it was found that is was much more difficult to color polished marble, granite or other hard surfaces having relatively small pore structures than to color honed and other more porous structures. On such polished surface substrates, the dye liquid "rolled" and formed droplets, globs or beads and much more effort was required to counteract such rolling, beading effects until the polished surface was "wet out" and accepted the dye liquid as a continuous wet film thereon. Attempts to solve this problem by adding viscosity-increasing thickening agents such as gums, Rhoplexes, and Acrysols were unsatisfactory since the thus-thickened dye liquids produced generally weaker colorations, apparently because the dye did not transfer readily from the dye liquid to the substrate.

The aforementioned problem was unexpectedly solved by incorporating in the dye liquid an effective thickening amount, typically about 1.5 to about 12, preferably about 1.5 to about 5, wt. % of finely divided, colloidal or fumed silica (silicon dioxide) thickening agent. Such silica-containing dye liquids were found to spread readily and uniformly on the polished substrate surface without forming droplets or beads. The dye was not held back or retained in the dye liquid but transferred readily to the substrate surface. The application of the dye liquid is thus simplified and expedited, coloring time is shortened, and much stronger colorations with no frosting are obtained. use of such silica-containing liquids is of course advantageous on any rigid porous substrate or artificial or natural stone, even if polished, but is most advantageous on polished substrates and on vertical surfaces of existing buildings requiring recoloration, color correction or modification. The silica in these dye liquids could, in view of its function and effect therein, be termed a spreading, transfer, and/or adhesion-promoting agent.

Such finely divided silica products are well known and readily available commercially, for example, as Cabot's Cab-O-Sil, Degussa's Aerosil, and Davison's Syloid (e.g. 244) colloidal, fumed silica grades. Fumed or pyrogenic silica is typically made by a vapor phase process involving hydrolysis of vaporized silicon tetrachloride at high temperatures e.g. about 1100° C., to produce silicon dioxide ($SiO_2$) and HCl. The resulting nonporous, extremely small, loosely agglomerated particles of silica typically have an average primary nominal particle size of about 0.005 to about 0.050 microns, an average surface area of about 50 to about 400 m$^2$/g. (square meters per gram), and an average bulk density of about 2.3 to about 7 lbs/ft$^3$ (pounds per cubic foot).

The liquid dye compositions of this invention may be prepared by thoroughly mixing the components in any desired order or sequence, if desired with the application of heat to facilitate solubilization and/or liquefication of normally solid components. The compositions may be applied uniformly or in any restricted areas of the substrate by any suitable means such as by spraying, brushing, wiping, roller coating, dipping, printing, stenciling and the like. The amount of dye composition applied to the substrate is not critical being in any particular instance sufficient to coat or form a wet film on the surface to be colored and to achieve the desired intensity of final color. After allowing the deposited dye composition to penetrate the substrate, typically about 5 to about 60 minutes, during which time some or all of the volatile components evaporate, remaining excess unpenetrated compositions is removed from the substrate as by rinsing (only on polished surfaces) and/or wiping with absorbent material, e.g. cloth or paper towel. Complete drying of volatile components may take some time—from hours to a day, the resulting dyed substrate being then acceptable for some purposes though generally having poor fastness to water and solvents.

Although any porous subtrate such as wood, leather, textiles and other fibrous materials, may be colored in accordance with this invention, its greatest advantages are to be found in the coloration of artificial and natural stone in any shape, size or surface configuration such as building or structural stone, support plate for mounting machinery, scientific instruments and monuments, gravestones, floor tiles or sections, and the like. Any naturaly occurring stone may be so colored, such as granite, dolomitic limestone, calcitic limestone, whitestone, dolomite, marble and the like, in addition to, for example land and aquatic animal bone and shell substrates and the like. No special pretreatment of the substrate, such as drying, roughening or the like, is needed. As artificial stone substrates which may be colored in accordance with this invention, it is intended to include cement, concrete, siliceous and grouting substrates, surfaces and objects.

In the development of this invention, attempts were made to insolubilize the penetrated dyestuff in situ by treatment with aqueous solutions of metal salts. Iron, zinc, barium and magnesium salt solutions were found to be too slow and/or insufficiently effective to form an insoluble metal/dye complex. Aluminum salt solutions were found to be only marginally faster and/or more effective. According to a preferred aspect of this invention, the penetrated (with dye) substrate is treated for a short but effective period of time, typically from about 0.1 to about 10 minutes, with an aqueous solution of a copper salt, such as the sulfate, chloride or acetate or the like, the copper salt concentration generally ranging from about 5 to about 25 wt. %. Rapid precipitation and/or insolubilization and/or complexing of the penetrated dye takes place to yield colorations of improved fastness to water, many solvents and light. The copper salt solution is applied by any suitable method, including those described above for application of the liquid dye composition, and excess salt solution on the surface of the substrate is removed in like manner as described above, e.g. by simply drying, wiping, rinsing or the like.

According to another preferred aspect of this invention, the substrate is similarly treated following impregnation with the described liquid dye composition with an aqueous solution of a polymerisable organic siliconate, preferably water soluble sodium methyl siliconate, available in the form of Dow-Corning No. 772 Water Repellent, 30% solids. The solution may preferably be diluted to about 1 to 10 wt. % of the siliconate for treating the substrate, and allowed to remain on the substrate for a time, typically about 0.5-15 minutes, preferably about 1 to 5 minutes, sufficient to permit reaction of the siliconate with moisture and carbon dioxide in the air to form an insoluble water resistant resin within about 24 hours, and reaction with the impregnated penetrated dye to form an insoluble precipitate therewith. Excess surface siliconate solution is then preferably wiped off, especially on polished surfaces, and the substrate permitted to dry yielding a water repellent surface with good fastness properties.

The following examples are only illustrative or preferred embodiments of this invention and are not to be regarded as limitative. All amounts and properties referred to herein and in the appended claims are by weight unless othewise indicated:

EXAMPLE 1

10 cc. VF dye conc. Black RL Liq., C.I. Acid Black 63, C.I. 12195
5 cc. Cellosolve
0.5 g. Syloid 244

Mix well, then apply with a paint applicator, roller, cloth, etc on honed marble plate. Keep marble plate uniformly coated. After 15 minutes wipe surface and treat colored plate with a 10% solution of coppersulfate to insolubilize the dye. Rub vigorously with a cloth or brush to remove surface dye after about 2-5 minutes and let dry.

A strong, medium black coloration is obtained fast to water and many solvents. Penetration is about ¼ inch. Deeper penetration can be obtained if the dye liquid is kept on the stone for a longer time.

In open stone—larger pores, grainy—it would not be desirable to rinse with water, too much dye would be lost. Instead, if necessary, remove excess with a cloth or paper towel and after about 5 to 60 minutes apply copper sulfate. In most cases one may almost immediately treat with copper sulfate. The conversion to the insoluble form is quite rapid.

EXAMPLE 2

The formulation of Example 1 is applied on polished marble and polished granite plates which are uniformly covered with the dye liquid for 30 minutes, water-rinsed, towel dried, then treated with copper sulfate as above. Medium black shades are obtained on both substrates with good penetration.

EXAMPLE 3

The formulation of Example 1 is applied on honed granite, and on limestone by the same procedure, but a final rinse to remove any surface dye. A strong black shade is obtained with good penetration and fastness properties.

EXAMPLE 4

5 cc. VF dye conc. Blue FFG Liq, C.I. Acid Blue 209
5 cc. Cellosolve
0.3 g. Syloid 244

Apply as in Example 1 on honed marble, and polished marble. After 20 minutes excess dye liquid is removed with a damp towel, followed by treatment with 10% aqueous coppersulfate. Rinse and dry.

A pleasing blue on the polished marbel results.

A somewhat stronger blue on the honed marble is obtained.

In all cases it takes some time—from hours to a day for the stone plate to dry.

EXAMPLE 5

10 cc. VF dye conc. Red GL Liq., C.I. Acid Red 226
5 cc. Propyl Cellosolve
0.3 g. Syloid 244

Apply as in Example 1 on honed marble and polished marble for 30 minutes. Remove excess with a paper towel, or damp cloth towel and then similarly treat with 10% copper sulfate. A very beautiful red on the polished marble, an even stronger red on the honed marble is obtained with good penetration and fastness properties.

EXAMPLE 6

49 cc. VF dye conc. Brown 5RL Liq., C.I. Acid Red 227
21 cc. VF dye conc. Brown R Liq., C.I. Acid Brown 50
8 g. Syloid 244

This is a fairly viscous liquid which is transferred to a paint applicator. This applicator is then applied to a vertical standing 12"×12" granite plate from Cold Spring Granite Co. having a weak reddish brown (their Carnelian) shade, in order to strengthen the shade. After one hour, the plate is rinsed with cold water and dried, without further treatment. The shade obtained is much more intense than expected.

EXAMPLE 7

20 cc. VF dye Yellow GL Liq., C.I. Acid Yellow 118
0.5 g. Syloid 244

Apply on polished marble and polished granite plates. Keep stone plates evenly coated with the dye liquid. After 15 minutes remove excess dye from the substrate surface and treat with a 5% aqueous solution of copper chloride for a few minutes and rinse to removed any surface color liquid. A beautiful greenish yellow of good penetration and fastness properties is obtained on both substrates.

EXAMPLE 8

1.5 cc. VF dye conc. Yellow R L Liq., C.I. Acid Yellow 119
2.5 cc. VF dye conc. Blackc R L Liq., C.I. Acid Black 63, C.I. 12195
5.0 cc. VF dye Blue LB Liq.
0.3 g. Syloid 244

Apply on polished marble and polished granite. After 20 minutes, remove excess with damp towel or rinse with cold water, followed by treatment with 10% aqueous copper sulfate. A medium green of good penetration and fastness properties is obtained.

EXAMPLE 9

4.5 cc. VF dye Rubine BL Liq., C.I. Acid Red 296, C.I. 15675
0.5 cc. VF dye conc. Yellow RL Liq., C.I. Acid Yellow 119
18.0 cc. Cellosolve
7.0 cc. Xylol
0.5 g. Syloid 244

Apply on honed marble, honed granite and limestone, let stand for 20 minutes. Treat with 10% aqueous copper sulfate, let stand for a short time, e.g. about 0.5–10 minutes, and rinse to remove excess insoluble dye. A very pleasing pink is obtained on the honed marble and granite. A deeper pink is obtained on the limestone. All have good penetration and good fastness to water and solvents. The xylol promotes penetration. Similar results are obtained when the xylol is replaced by toluol. Improved results are likewise obtained when about 10 to 15 wt. % of the toluol or xylol, or a 1:1 mixture thereof, are included in the liquid dye compositions of Examples 1–8.

EXAMPLES 10-17

Improved results in fastness properties and water repellency are obtained when the copper salt treatments of Examples 1-5 and 7-9 are replaced by treatment with an aqueous solution of Dow Corning 772 Water Repellent (30% solids sodium methyl siliconate) diluted to 3%.

This invention has been disclosed with respect to certain preferred embodiments, and it will be understood that modifications and variations thereof obvious to those skilled in the art are to be included within the spirit and purview of this application and the scope of the appended claims.

I claim:

1. A liquid dye composition comprising at least one organic solvent-soluble azo dyestuff, said dyestuff being devoid of carboxylic and sulfonic acid groups and metallized with chromium, cobalt or nickel, in a substantially anhydrous volatile polar organic solvent medium, said composition further containing at least one member of the group consisting of, approximately by weight:
    A. 1.5 to 12% of finely divided colloidal fumed silicon dioxide thickening agent, and
    B. 5 to 50% of xylol, toluol, perchlorethylene, or mineral spirits or any mixtures thereof.

2. The composition of claim 1 wherein said dyestuff contains a sulfonamide group as nuclear substituent.

3. The composition of claim 1 containing about 1.5 to about 25 wt. % of said dyestuff.

4. The composition of claim 1 which contains about 1.5 to about 25 wt. % of at least one chromium complexed nuclearly sulfonamide -substituted such dyestuff.

5. The composition of claim 4 further containing about 5 to about 50 wt. % of toluol or xylol or any mixture thereof.

6. The composition of claim 5 further containing Component A.

7. The composition of claim 4 further containing Component A.

8. A process for coloring a natural or artificial stone substrate comprising (1) applying thereto a composition as defined in claim 1, (2) allowing the composition to penetrate the substrate, and (3) removing excess unpenetrated composition from the substrate.

9. The process of claim 8 followed by (4) treating the penetrated substrate with an aqueous solution of a copper salt to insolubilize the penetrated dyestuff.

10. The process of claim 9 wherein said composition contains about 1.5 to about 25 wt. % of at least one chromium complexed, nuclearly sulfonamide-substituted such dyestuff, said polar organic solvent medium contains either or both the monoethyl and monopropyl ethers of ethylene glycol, and said copper salt comprises copper sulfate or copper chloride.

11. The process of claim 10 wherein said composition further contains about 5 to about 50 wt. % of toluol or xylol or any mixture thereof.

12. The process of claim 11 wherein said composition further contains component A.

13. The process of claim 10 wherein said composition further contains component A.

14. The process of claim 8 followed by (4) treating the penetrated substrate with an aqueous solution of a polymerizable water soluble sodium methyl siliconate to insolubilize the penetrated dyestuff.

15. The process of claim 14 wherein said composition contains about 1.5 to about 25 wt. % of at least one chromium complexed, nuclearly sulfonamide-substituted such dyestuff and component A.

16. The process of claim 15 wherein said composition further contains about 5 to about 50 wt. % of toluol or xylol or any mixture thereof.

17. A process for coloring a natural or artificial stone substrate comprising (1) applying thereto a liquid dye composition comprising at least one organic solvent-soluble azo dyestuff, said dyestuff being devoid of carboxylic and sulfonic acid groups and metallized with chromium, cobalt or nickel, in a substantially anhydrous volatile polar organic solvent medium, (2) allowing the composition to penetrate the substrate, and (3) removing excess unpenetrated composition from the substrate.

18. The process of claim 17 followed by (4) treating the penetrated substrate with an aqueous solution of (a) a copper salt, or (b) a polymerizable water soluble sodium methyl siliconate.

19. The process of claim 18 wherein said composition contains about 1.5 to about 25 wt. % of at least one chromium complexed, nuclearly sulfonamide-substituted such dyestuff, said polar organic solvent medium contains either or both the monoethyl and monopropyl ethers of ethylene glycol, and said copper salt comprises copper sulfate or copper chloride.

* * * * *